United States Patent
Pisz et al.

(10) Patent No.: US 9,482,761 B2
(45) Date of Patent: Nov. 1, 2016

(54) GPS GATE SYSTEM

(75) Inventors: James T. Pisz, Huntington Beach, CA (US); Brian H. Inouye, Rancho Palos Verdes, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 1413 days.

(21) Appl. No.: 12/342,626

(22) Filed: Dec. 23, 2008

(65) Prior Publication Data

US 2010/0156712 A1   Jun. 24, 2010

(51) Int. Cl.
| | | |
|---|---|---|
| G01S 1/00 | (2006.01) | |
| H04Q 7/20 | (2006.01) | |
| G01S 19/48 | (2010.01) | |
| G01S 5/00 | (2006.01) | |
| G01S 19/14 | (2010.01) | |
| G01S 19/52 | (2010.01) | |
| G08G 1/00 | (2006.01) | |
| G08G 1/127 | (2006.01) | |
| B60H 1/00 | (2006.01) | |
| G08G 1/017 | (2006.01) | |
| G08G 1/065 | (2006.01) | |

(52) U.S. Cl.
CPC ............ *G01S 19/48* (2013.01); *G01S 5/0027* (2013.01); *G01S 19/14* (2013.01); *G01S 19/52* (2013.01); *G08G 1/207* (2013.01); *B60H 1/00771* (2013.01); *G08G 1/017* (2013.01); *G08G 1/065* (2013.01); *G08G 1/127* (2013.01)

(58) Field of Classification Search
None
See application file for complete search history.

(56) References Cited

U.S. PATENT DOCUMENTS

| | | | |
|---|---|---|---|
| 6,202,023 B1* | 3/2001 | Hancock et al. | 701/201 |
| 6,232,880 B1 | 5/2001 | Anderson et al. | |
| 6,253,129 B1* | 6/2001 | Jenkins et al. | 701/32.3 |
| 6,353,390 B1 | 3/2002 | Beri et al. | |
| 6,411,891 B1* | 6/2002 | Jones | 701/201 |
| 6,429,773 B1* | 8/2002 | Schuyler | 340/425.5 |
| 6,677,854 B2 | 1/2004 | Dix | |
| 6,980,131 B1* | 12/2005 | Taylor | 340/994 |
| 7,319,412 B1* | 1/2008 | Coppinger et al. | 340/988 |
| 7,421,334 B2* | 9/2008 | Dahlgren et al. | 701/117 |
| 8,593,276 B2* | 11/2013 | Doyle | 340/539.13 |
| 2001/0018628 A1* | 8/2001 | Jenkins et al. | 701/35 |
| 2005/0032528 A1* | 2/2005 | Dowling et al. | 455/456.1 |
| 2005/0065711 A1* | 3/2005 | Dahlgren et al. | 701/117 |
| 2005/0096020 A1 | 5/2005 | Oesterling et al. | |

(Continued)

FOREIGN PATENT DOCUMENTS

EP   1 209 863   5/2002

OTHER PUBLICATIONS

International Search Report dated Dec. 10, 2009, issued in corresponding International Application No. PCT/US2009/061007.

(Continued)

*Primary Examiner* — Mussa A Shaawat
(74) *Attorney, Agent, or Firm* — Andrews Kurth Kenyon LLP

(57) ABSTRACT

A GPS gate system is described for triggering transmission of a message. The system may include a GPS receiver determining a location of the GPS receiver based upon signals received from a GPS satellite system. The GPS receiver determines if the GPS receiver has passed through a GPS gate based upon the received signals. The GPS system may further include a communications system to connect the GPS receiver with a GPS gate communications system to receiver a message generated by the GPS receiver based upon the crossed GPS gate.

26 Claims, 8 Drawing Sheets

(56) References Cited

U.S. PATENT DOCUMENTS

| | | |
|---|---|---|
| 2006/0264221 A1 | 11/2006 | Koike et al. |
| 2007/0129888 A1* | 6/2007 | Rosenberg ............... 701/213 |
| 2007/0176771 A1* | 8/2007 | Doyle ................. 340/539.13 |
| 2008/0162034 A1* | 7/2008 | Breen ..................... 701/202 |
| 2008/0221767 A1 | 9/2008 | Ikeda et al. |
| 2009/0009321 A1* | 1/2009 | McClellan et al. ...... 340/539.13 |
| 2012/0044063 A1* | 2/2012 | McClellan et al. ........... 340/441 |

OTHER PUBLICATIONS

Written Opinion dated Dec. 10, 2009, issued in corresponding International Application No. PCT/US2009/061007.

European Supplementary Search Report, dated Jul. 9, 2014, issued in corresponding European Patent Application No. 09835421.0.

* cited by examiner

GPS GATE SYSTEM

BACKGROUND

The integration of global positioning systems (GPS) and vehicles has ushered in a new era for vehicular safety and convenience. A GPS receiver uses signals from orbiting satellites to calculate its position. In recent years, GPS has been integrated with cellular phones and automobiles. When the automobile has detected that is has been in an accident or has broken down, the GPS system and cellular phone may be used to connect with a call center so that the driver can receive help. However there is a need for a method and system for automatically triggering transmission of a message when a vehicle reaches a specific location.

One possible solution uses an automobile equipped with a wireless network card or a Bluetooth® communication system to communicate with service locations. The wireless network card or the Bluetooth® communication system constantly poll for a transceiver to connect with. When within range of a wireless RF transceiver at the service location, the wireless network card or Bluetooth® communication system establishes communication with the transceiver so the devices can exchange data. However, every service location must have a transceiver installed on location to communicate with the vehicle making a global system expensive to implement. Furthermore, because the wireless network card or Bluetooth® communication system is constantly poling to find a connection, unnecessary power is wasted. Furthermore, security measures must be in place for each vehicle and each service location to prevent electronic eavesdropping.

Accordingly, there is a need for a secure and accurate method and system for triggering messages from a device to a desired recipient based upon a precise location of a device that does not require transceivers at each location.

DETAILED DESCRIPTION

A GPS gate system, in accordance with an embodiment of the present invention, may include a GPS receiver in communication with a GPS satellite system to calculate a position of the GPS receiver. The GPS gate system may further include a GPS gate communication system to receive messages from the GPS receiver. The messages may be delivered by a communications system, such as a cellular network, in communication with the GPS receiver and the GPS gate communication system. The GPS receiver may store the location of GPS gates and transmit a message to the GPS gate communications system associated with the GPS gate when the GPS receiver is determined to have passed through the GPS gate. A GPS gate being used as a trigger to send a message to an associated GPS gate communications system has the advantages of being more precise and controllable than the conventional methods. Furthermore, because the GPS gates are virtual, there is no cost to add additional gates to the system.

Figure 1:
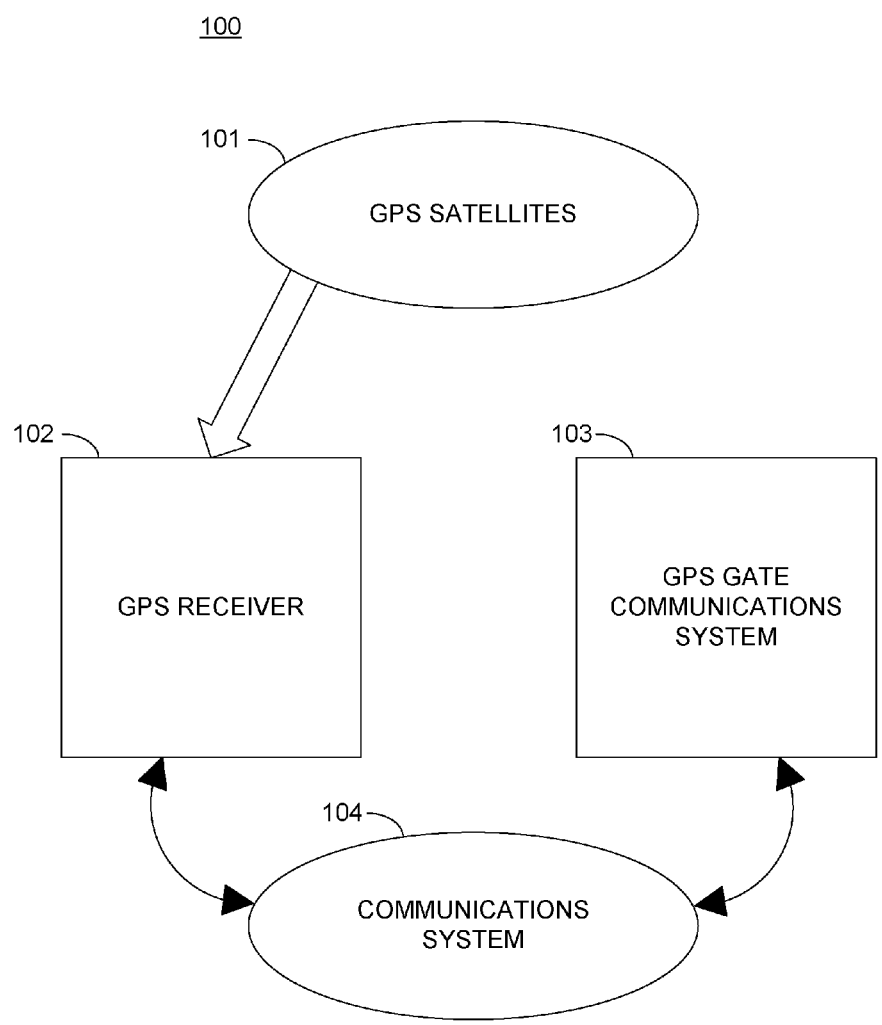
FIG. 1 illustrates an exemplary embodiment of a GPS gate system.

An exemplary embodiment of the GPS gate system 100 can be seen in FIG. 1. FIG. 1 illustrates a GPS satellite system 101, which transmits a plurality of signals to a GPS receiver 102 which uses the transmitted signals to determine a location of the GPS receiver 102. A communications system 104, such as a telephone network, a cellular network, a satellite network, a wireless internet connection or the like, communicatively connects the GPS receiver to a GPS gate communication system 103.

The GPS satellite system 101 includes a plurality of satellites orbiting around the earth. Each satellite transmits its precise orbital location and a time the signal is transmitted. The GPS receiver 102 calculates its own location based upon the signals transmitted by the GPS satellite system 101 by computing a distance to each satellite based upon the time the message sent by the satellite takes to reach the GPS receiver 102. Geometric trilateration is used to combine these times with the location of the satellites to determine the receiver's location. The GPS receiver 102 typically needs to receive signals from four satellites to calculate its location, however, fewer may be used if the GPS receiver 102 knows one variable, for example, the elevation of the GPS receiver 102.

Alternatively, a position of the receiver may be calculated without using the GPS satellite system, by using multiple access points, such as cellular towers or Wi-Fi transmitters, to triangulate a position of a receiver. The GPS receiver 200 may be able to switch positioning systems from the GPS satellites to the multiple access points system to determine its location if the GPS receiver does not receive signals from a sufficient number of satellites.

Figure 2:
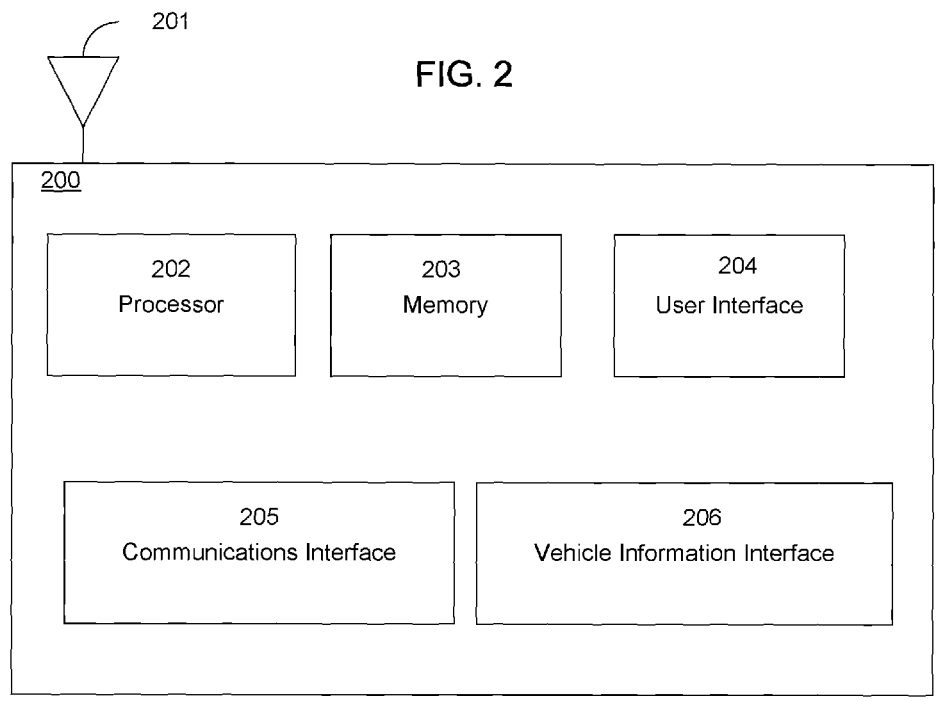
FIG. 2 illustrates an exemplary GPS receiver.

An exemplary embodiment of a GPS receiver 200 can be seen in FIG. 2. The GPS receiver may be a unit integrated into a vehicle console, a stand-alone mobile unit or part of another device, such as a cellular or satellite based phone. The GPS receiver may include a processor 202 to calculate the location of the GPS receiver 200 based upon signals received by an antenna 201. The GPS receiver 200 may include a memory 203 to store, for example, maps and locations of GPS gates. The GPS receiver 200 may also use memory associated with another device, such as memory integrated into a vehicle to store maps and locations of GPS gates. Alternatively, the memory may be separate from the GPS receiver, for example, a computer-readable medium, such as an external hard drive, a flash drive, a CD, a DVD or a Blu-Ray® DVD drive may be used. The GPS receiver may further include a user interface 204. The user interface 204 may include a screen and an input device. The screen may be, for example, an LCD screen, a CRT, a plasma screen, an OLED screen or the like. The input device may be a keyboard, a mouse, touch screen sensors or any other user input device that would allow a user to interact with the GPS receiver 200.

The user interface 204 may allow the user to enter in new GPS gate locations, as well as customize messages to be sent when the GPS receivers 200 passes through the GPS gates.

Further, the user interface 204 may be used to select which GPS gates are active, thereby allowing a user to control when messages are sent. The user interface 204 may give the user the option of sending a message after crossing a GPS gate and the option to receive a message after crossing a GPS gate. The user interface 204 may also be used to access all of the settings for the GPS receiver 200. The user interface 204 may also be used to get directions, find local restaurants or any other features typically associated with a GPS receiver.

Alternatively, the GPS receiver 200 may be installed without a user interface. In this embodiment, modifying system settings and establishing new GPS gates can be accomplished through the communications interface. For example, a user may be able to remotely access their GPS receiver through an external interface, such as through a website or call into the GPS receiver. Further, a user may be able to load new data and modify existing data using a USB stick, a SD card, MicroSD card or the like.

The GPS receiver may also include a communications interface 205. The communications interface 205 allows the GPS receiver 300 to transmit and receiver messages. The communications interface 205 may be a cellular phone interface or a wireless internet interface. The messages transmitted by the communications interface 205 include, but are not limited to, text messages, email, web pages, instant messages, voice messages and faxes.

In another embodiment, if the GPS receiver is integrated into a vehicle, the communications interface 205 may connect to cellular phone of the vehicle operator through, for example, a Bluetooth® connection to transmit and receive messages.

The GPS receiver 200 may also include a Vehicle Information interface 206, which may gather diagnostic information about a vehicle from a vehicle's internal computer. In one embodiment, the diagnostic information may be transmitted by the GPS receiver 200 to a service location. A user may place a GPS gate at the service location the user desires to use, or, alternatively, the GPS receiver may be preprogrammed with GPS gates at a set of repair locations or every authorized repair location associated with the user's vehicle. New service locations, and their associated GPS gates, may be added via the user interface by the user or may be added by a car company via the communication's system 104. Furthermore, the user, the service location or any other GPS gate communication system owner can modify the location of the GPS gate through the user interface or the communications system 104. Alternatively, new GPS gates, and modification of existing gates, may be accomplished via an interface using a CD, DVD, Blu-Ray® DVD, USB memory stick, SD memory card or any other computer-readable medium.

Figure 9:
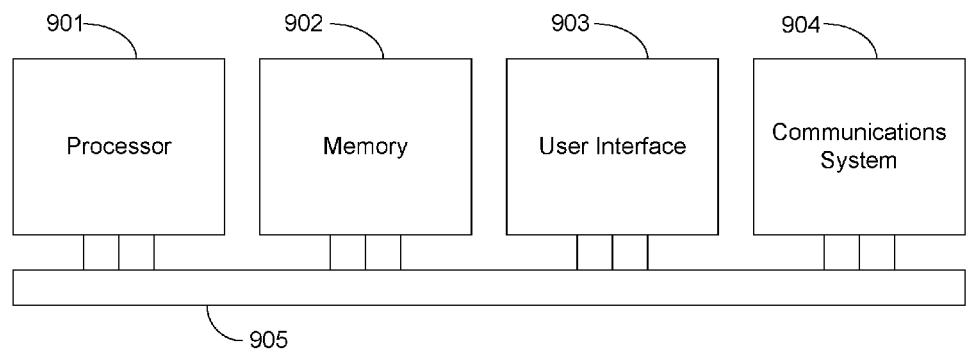
FIG. 9 illustrates exemplary embodiment of a monitor or GPS gate communication system.

The GPS gate communications system 103 may be a cellular telephone, satellite telephone, PDA, smart phone or the like, a fax machine, as well as any computer system capable of receiving data and/or voice messages. The GPS gate communications system 103 may be integrated with other systems, such as car diagnostic equipment, inventory tracking systems, email servers to use the information received in the message. The GPS gate communications system 103 may also transmit messages back to the GPS receiver 102. An exemplary embodiment of a GPS gate communications system 103 can be seen in FIG. 9. FIG. 9 include a processor 901, a memory 902, a user interface 903 and a communications system 904 all connected by a bus 905.

GPS gates are virtual gateways which are used to trigger correspondence between the GPS receiver and the GPS gate communications system. One advantage of using GPS gateways to trigger messages is that no equipment is required at the trigger point since the GPS gate is merely data stored with the GPS receiver. Accordingly, an unlimited number of GPS gates can coexist. Further, because the GPS receiver can accurately determine its location down to several inches, the GPS gates can be placed in precise locations. Furthermore, multiple GPS gates can exist in close proximity to each other, each of which may trigger a different message, without interfering with each other.

The length, width and height of the GPS gates can be variable. For example, a GPS gate can be 10 feet wide and placed across a driveway, 80 feet across and placed across a highway, or thousands of feet placed across a specific longitude or latitude. The shape of the GPS gate can also be selected. For example, the GPS gate may be a line, a square, a circle, spherical, cubicle or any other conceivable shape. The elevation of the GPS gate can also selected.

In one embodiment, the GPS gate can be placed at a port which receives ships carrying vehicles. Once the ship, having a GPS receiver installed therein, arrives at port and crosses the GPS gate, a message may be sent to indicate that the ship arrived and may also contain information of the contents of the ship. In another embodiment, each car loaded on the ship may have a GPS receiver 200 installed therein. Once the ship, and the cars therein, pass through the GPS gate, the GPS receivers can send a message to the car dealership expecting the car and/or a purchaser of the car to indicate that the car has arrived at port. The GPS receiver may also send a message to the car manufacturer indicating that the car has arrived at port.

The GPS gates can be single directional or bidirectional, allowing the GPS receiver to only send a message when the GPS gate is crossed in a single direction, to send an identical message when the GPS gate is crossed in either direction or to send different messages when the GPS gate is crossed in different directions. For example, a GPS gate could be placed at the entrance of a school parking lot and a GPS receiver could detect when a student carrying the GPS receiver, or one installed in a vehicle driven by the student, enters the parking lot, sending a text message to the student's parent's cell phones or an email to their parent's email accounts informing the parents that the student has arrived. When the student leaves the parking lot, crossing the GPS gate in a different direction, a message informing the student's parents that the student has left the school can be sent.

Figure 3:
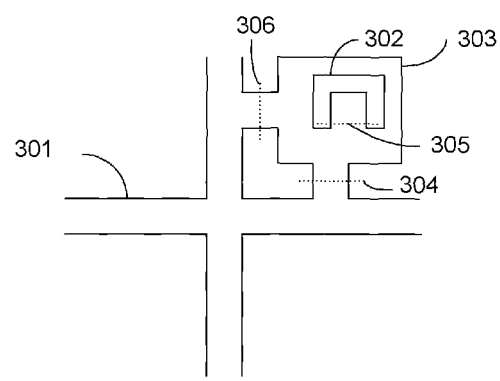
FIG. 3 illustrates an exemplary use of GPS gates.

FIG. 3 illustrates an exemplary embodiment using multiple GPS gates. FIG. 3 illustrates an intersection 301 with a building 302 at the north east quadrant. The building 302 is surrounded by a parking lot 303 and has two entrances to the intersection 301. In this embodiment GPS gates 304 and 306, represented by the dotted lines, are stationed at the entrances to the parking lot 303. Alternatively, a GPS gate could be placed along the entire perimeter of the property. If, for example, the building 302 was a service location, the GPS receiver, upon detecting that the GPS gate was crossed, may send a message to the service location through the communications system to inform the service location that the owner of the car had arrived. The message may be received by a computer system of the service location, a cell phone, PDA or any other electronic device used by the service location. An employee of the service location, for example, would be able to receive the message, pull of the history of the vehicle and determine if the owner has arrived for a scheduled appointment. Further, in this embodiment a third GPS gate 305 is stationed at an entrance of a service bay. Accordingly, when the GPS receiver detects that the GPS gate 305 has been crossed, diagnostic information may be transferred to the service location through the communications system. For example, the cars mileage, maintenance history and any error codes may be transferred to the service location. Accordingly, one advantage of using GPS gates to trigger transmission of a message is that different messages can be sent at the same location depending upon which GPS gate was crossed at that location.

In another embodiment multiple GPS gates can be placed on a highway. When a GPS receiver passes trough a first GPS gate a message may be sent through the communications system to a traffic monitoring server indicating when the GPS gate was crossed. When the GPS receiver passes through a second GPS gate, which is a known distance from the first GPS gate, another message can be sent and then the traffic monitoring server can calculate the time it took for the GPS receiver to travel from the first gate to the second gate. The traffic monitoring server can determine the level of traffic on the highway based upon the received messages.

The GPS gates may be placed in a multitude of locations. In one embodiment, a GPS gate may be placed at the entrance of a drive thru. Once the GPS receiver determines that the GPS gate has been crossed, the GPS receiver can transmit a message to the restaurant. For example, the GPS receiver can transmit an order entered into the GPS receiver through the user interface. Alternatively, a customer's favorite order may be stored at the restaurant, and when the customer's GPS receiver crosses the GPS gate, the customer's favorite order can automatically be placed. Further, an order could be placed online, placed via a call or through the user interface 204 of the GPS receiver prior to the arrival of the customer, and when the user enters the parking lot or driver-thru of the restaurant, the restaurant can be informed that the purchaser has arrived and deliver the order.

In another embodiment, a GPS gate may be place at an entrance of an airport or train station and, when the GPS gate is crossed, a message could be sent to the airport and train station to check a user in.

Furthermore, the GPS receiver may be able to receive information after passing through a GPS gate. Using the airport example above, after a user has been checked in for their flight or train, the airport's system can send a message to the GPS receiver, for example, informing the user of their gate, if the plane is on time, whether there are seats available on an earlier flight or whether there are seat upgrades available.

While the GPS gates may be simple data points within the system, a service location, for example, may indicate where the GPS gate is located to give customers the option of passing through the GPS gate.

Figure 4:
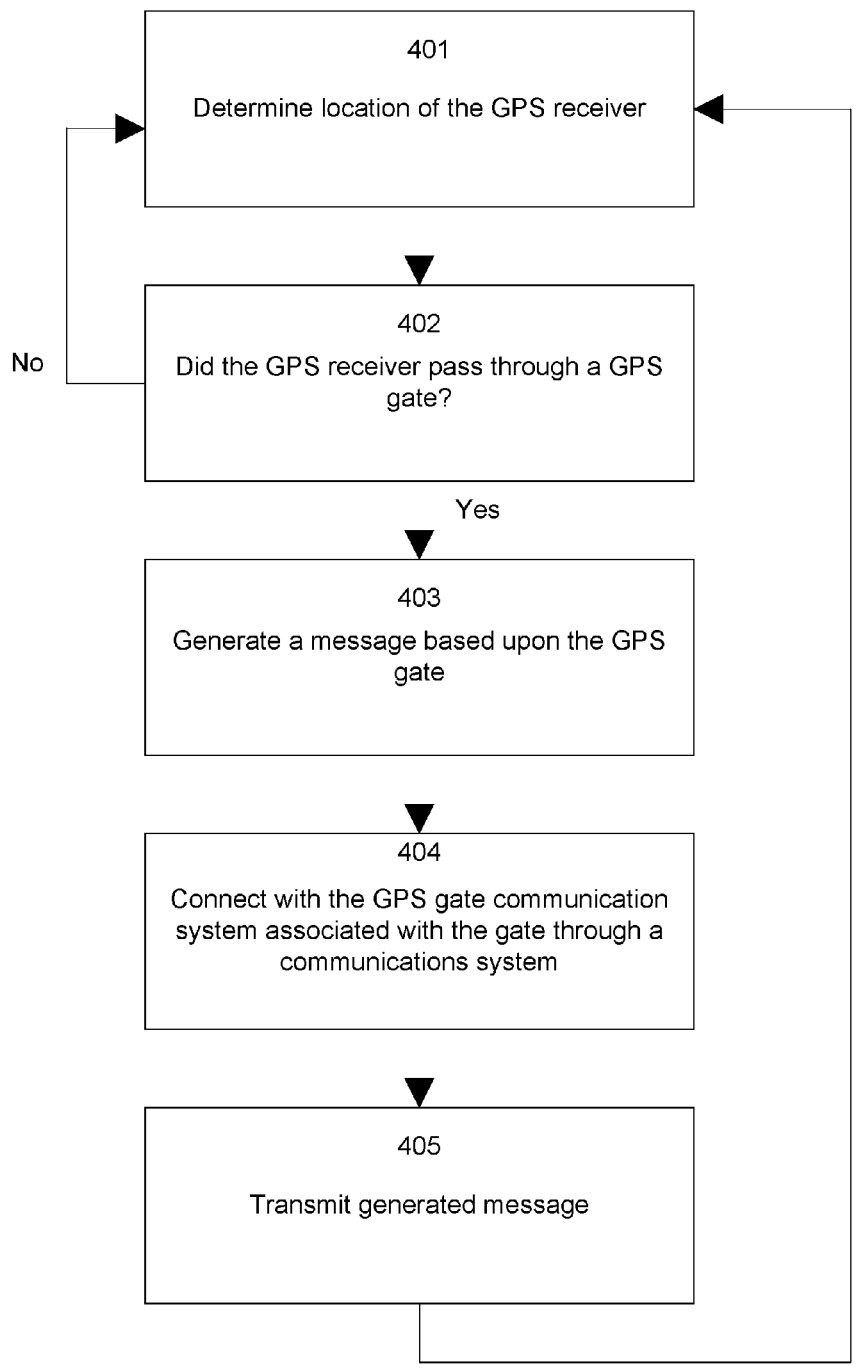
FIG. 4 illustrates an exemplary method of using a GPS gate system.

FIG. 4 illustrates an exemplary method of using a GPS gate system. At Step 401 a GPS receiver determines its location based upon the signals received from a network of satellites. At Step 402, the GPS receiver determines if it has passed through a GPS gate. The GPS receiver, by comparing a present location against a previously determined location, can identify a direction the GPS receiver is traveling as well as a speed. If the GPS receiver has not passed through a GPS gate, the process returns to Step 401. If the GPS receiver has passed through a GPS gate, the GPS receiver generates a message based upon the GPS gate which was crossed 403. The GPS receiver may then connect to a GPS communication system associated with the crossed GPS gate through a communications system 404 and transmit the generated message 405.

Figure 5:
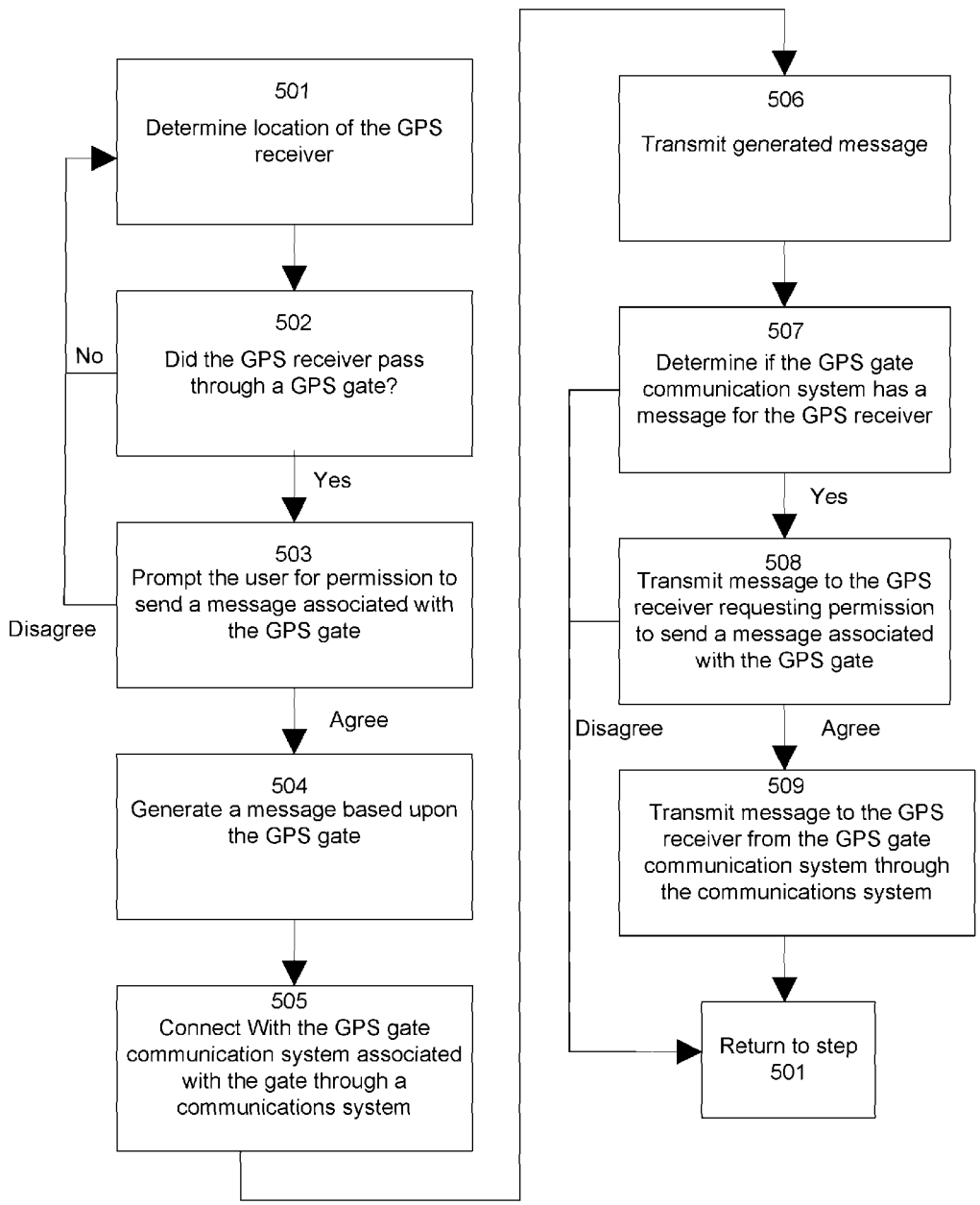
FIG. 5 illustrates another exemplary method of using a GPS gate system.

FIG. 5 illustrates yet another exemplary method of using a GPS gate system. At Step 501 a GPS receiver determines its location based upon the signals received from a network of satellites. At Step 502, the GPS receiver determines if it has passed through a GPS gate. If the GPS receiver has not passed through a GPS gate, the process returns to Step 501. If the GPS receiver has passed through a GPS gate, the GPS receiver requests permission from a user to send a message associated with the crossed GPS gate. If the user disagrees, the system returns to Step 501. The user's decision may be saved as a default so that the user will not have to accept every time the specific GPS gate is crossed. If the user agrees, the GPS receiver generates a message based upon the GPS gate which was crossed 504. The GPS receiver may then connect to a GPS communication system associated with the crossed GPS gate through a communications system 505 and transmit the generated message 506. The GPS communication system associated with the crossed GPS gate then determines if there is a message to send back to the GPS receiver 507 and sends a request to the user to accept the incoming message 508. If the user agrees to receive the message, the GPS communication system associated with the crossed GPS gate sends the message to the GPS receiver 509. If the user disagrees, the system returns to step 501.

Figure 6:
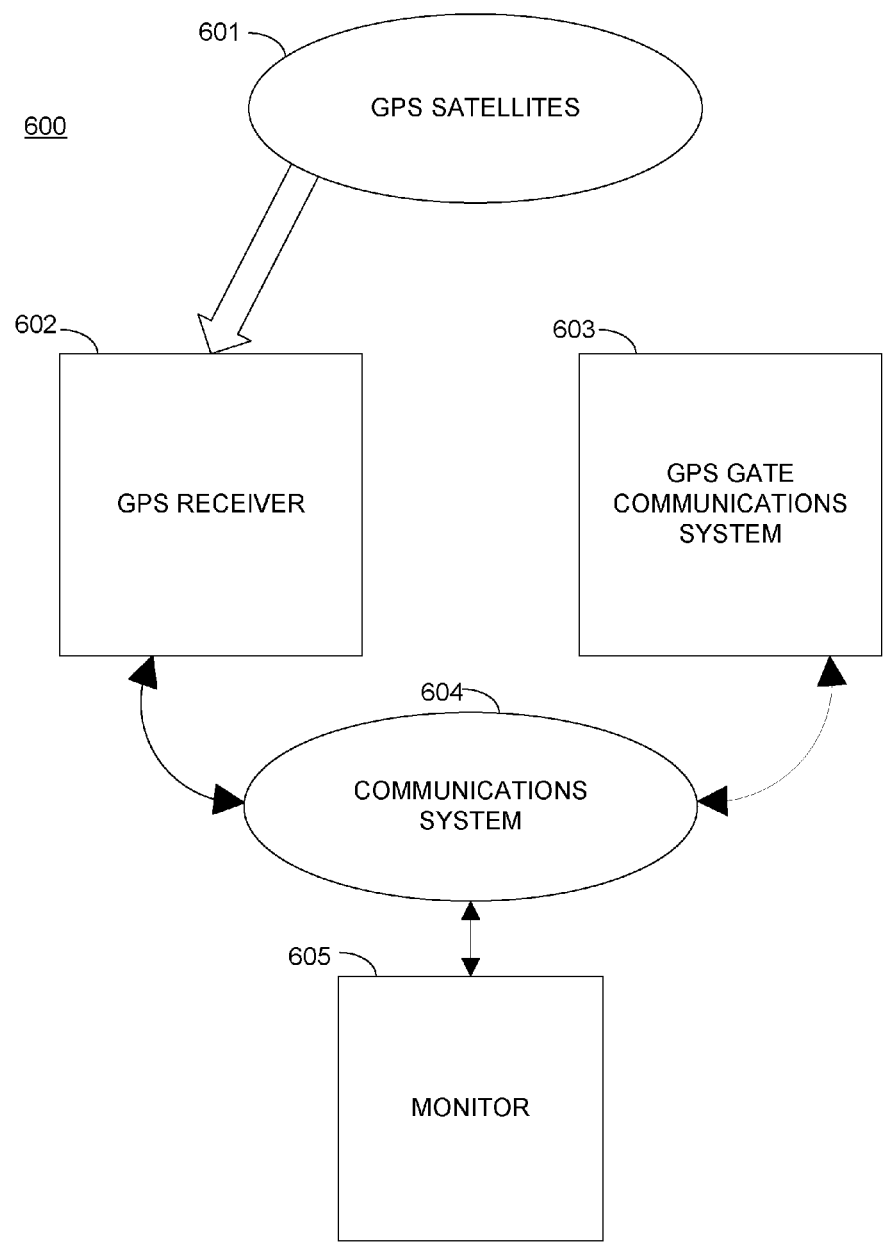
FIG. 6 illustrates another exemplary embodiment of a GPS gate system.

Another exemplary embodiment of a GPS gate system is illustrated in FIG. 6. FIG. 6 illustrates a GPS satellite system 601, which transmits a plurality of signals to a GPS receiver 602 which uses the transmitted signals to determine a location of the GPS receiver 602. The GPS receiver 602 is communicatively connected to a communications system 603, such as a cellular network, a satellite network, a wireless internet connection or the like, which is communicatively connected to a GPS gate communication system 604. A monitor is communicatively connected to the communications system 603 and monitors when the GPS receiver crosses a GPS gate.

Figure 7:
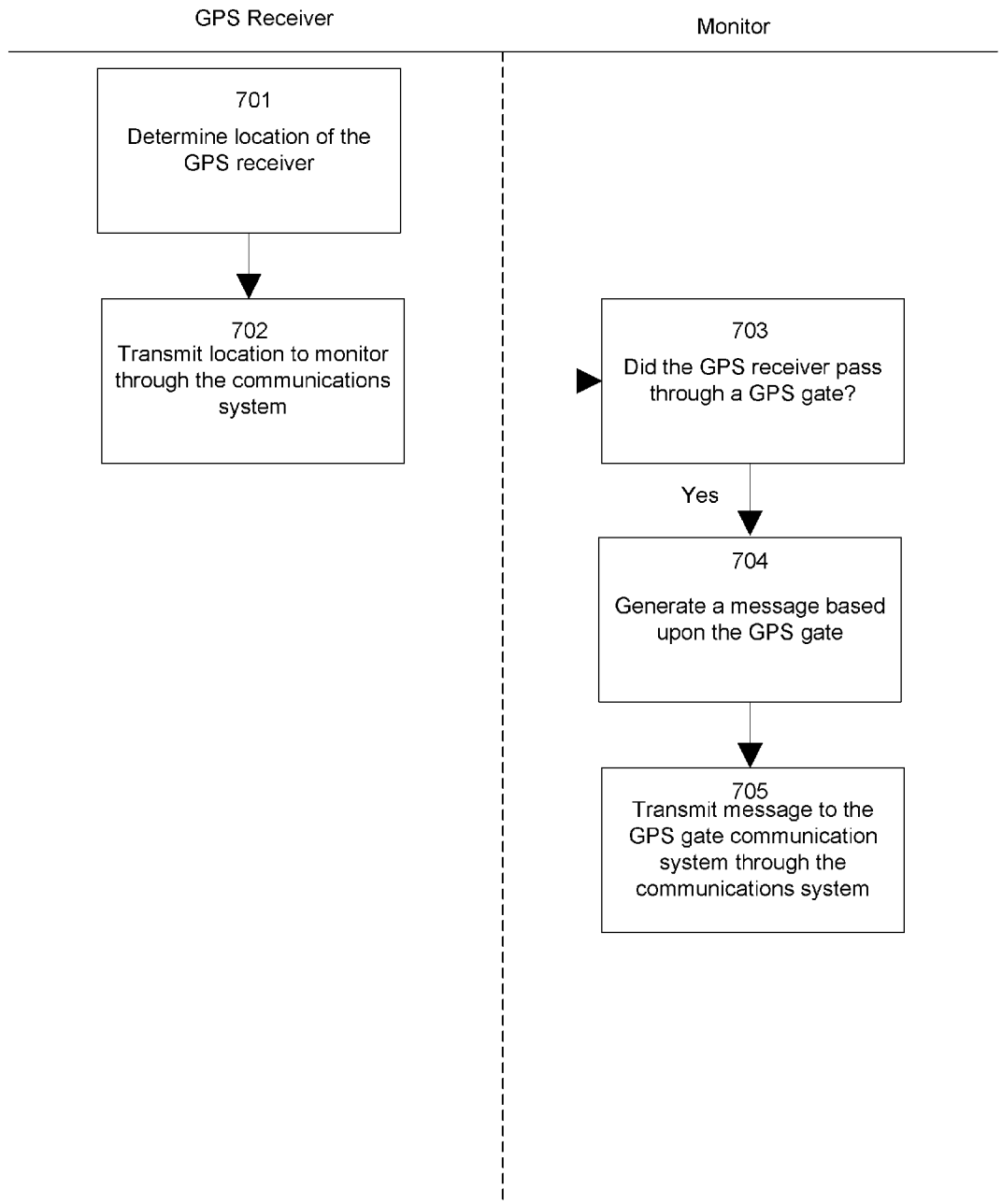
FIG. 7 illustrates an exemplary method of using a GPS gate system in accordance with FIG. 6.

FIG. 7 illustrates an exemplary method of using a GPS gate system in accordance with FIG. 6. At step 701 the GPS receiver determines its location based upon the signals received from the GPS satellite network. The Location determined by the GPS receiver is then transmitted to the monitor through the communications system. The monitor, at step 703, determines if the GPS receiver passed through a GPS gate. If the GPS receiver crossed a GPS gate, the monitor generates a message associated with the GPS gate (step 704) and transmits the message to an associated GPS gate communication system (Step 705).

Figure 8:
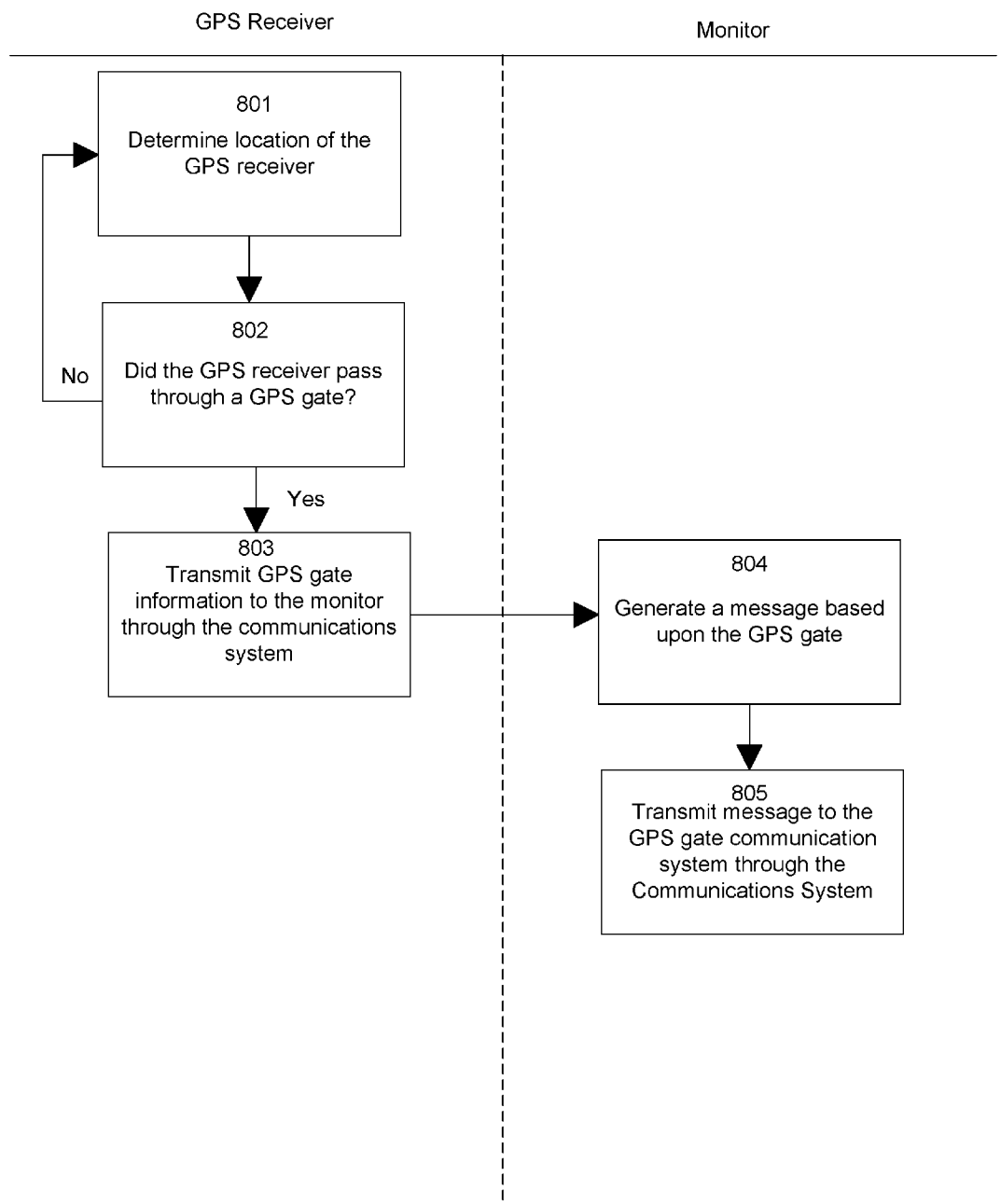
FIG. 8 illustrates another exemplary method of using a GPS gate system in accordance with FIG. 6.

FIG. 8 illustrates another exemplary method of using a GPS gate system in accordance with FIG. 6. At step 801 the GPS receiver determines its location based upon the signals received from the GPS satellite network. The GPS receiver then determines whether a GPS gate was crossed (Step 802). If no GPS gate was crossed, the system returns to step 801. If a GPS gate was crossed, the GPS receiver transmits the GPS gate information, such as the identity of the gate and the direction the gate was passed trough, to the monitor through the communication system (Step 803). At step 804, the monitor generates a message based upon the received GPS gate information and then transmits the message to a GPS gate communication system (Step 805).

FIG. 9 illustrates an exemplary monitor. FIG. 9 includes a processor 901, a memory 902, a user interface 903 and a communications system 904 connected by a bus 905. The monitor, for example, may be part of a call center or may be a network server.

Figure 10:
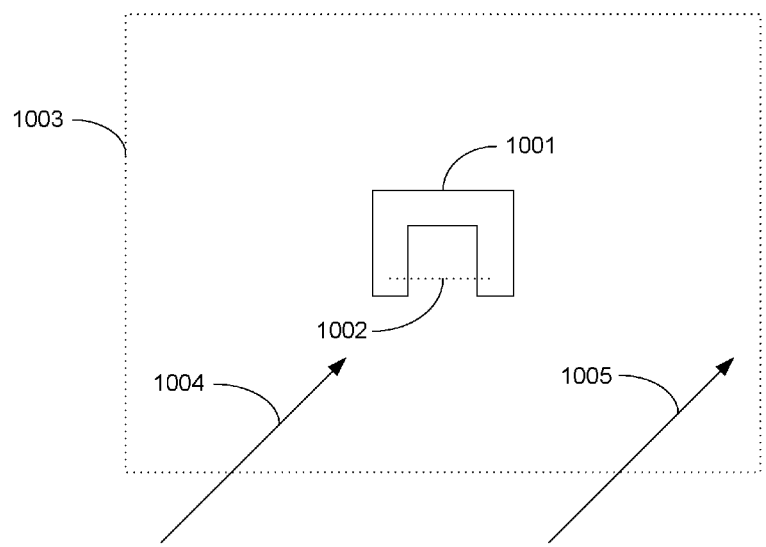
FIG. 10 illustrates another exemplary embodiment of using GPS gates

FIG. 10 illustrates an exemplary embodiment of using GPS gates. FIG. 10 illustrates a service location 1001 and a GPS gate 1002 at entrance to a service bay. The service location may upload a list of vehicles which have scheduled maintenance on a specific day. When a vehicle on the list passes through an outer GPS gate 1003, place, for example, one-mile away from the service location, the monitor tracking the vehicle may send a message to the service location informing the service location that the vehicle will be arriving soon. The monitor may also begin downloading the vehicles maintenance history to the service location after the vehicle passes through the outer GPS gate 1003. Alternatively, the monitor after detecting that a vehicle has passed through an outer GPS gate, may load information pertaining to the vehicle. After the vehicle has passed through a GPS gate closer to the service location, for example, the GPS gate 1002, the monitor may transmit the message to the service location.

In another embodiment, the outer GPS gate 1003 may be, for example, 50 yards away from the service location. If the service location was located on a street where the speed limit was, for example, 40 mph and when the GPS receiver crosses the GPS gate the GPS receiver was traveling at only 15 mph, the GPS receiver may determine that the vehicle is most likely going to enter the service location and transmit a message to the service station. However, if the GPS receiver is traveling at 40 mph when the GPS gate 1003 is crossed, the GPS receiver may determine that the vehicle is unlikely to be going to the service location, and therefore a message would not be sent. The GPS receiver may also determine a trajectory the GPS receiver is traveling in when determining whether to send a message when the GPS gate is crossed.

In yet another embodiment, when a vehicle which is scheduled for maintenance passes through a GPS gate, the GPS receiver may generate a message including a drivers preferences, for example, seat preferences or radio station preferences. The drivers preferences may then be transmitted to a GPS receiver in a loaner car so that when the driver enters the loaner car the drivers seat in already in a preferred location and one of the driver's favorite radio stations is playing. Driver's preferences may also be transmitted to a rental car if a GPS gate is located at a rental car location.

In a further embodiment, the monitor may determine a direction a car is traveling after passing through an outer GPS gate. For example, a car traveling in a direction according to arrow 1005, which has crossed GPS gate 1003 but is not heading towards the service location may not trigger a message, whereas a car traveling in the direction according to arrow 1004, that is, towards the service location, may trigger a message. The monitor, for example, may determine a direction the car is heading by comparing the present location of the car with past locations of the car. The monitor may also store a plurality of routes which would lead to a service location, and, if a vehicle scheduled for maintenance was traveling along the route, the monitor may send a message to the service location.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A GPS gate system comprising:
    an in-vehicle system comprising:
        a GPS receiver communicatively connected to a GPS system to identify a location of the GPS receiver,
        a communication interface to transmit and receive messages via a communication network, and
        a memory to store at least one set of GPS location coordinates corresponding to a GPS gate;
    a monitor server communicatively connected to the in-vehicle system via the communication network; and
    a service system associated with the GPS gate and communicatively connected to the monitor server,
    wherein the monitor server includes a memory to store information associating the GPS gate to the service system;
    wherein when the GPS receiver passes through the GPS gate, the in-vehicle system generates a first message and transmits the first message to the monitor server through the communication network, the first message including vehicle diagnostic information, and
    wherein, the monitor server receives the first message and determines that the GPS receiver passed through the GPS gate in a predetermined direction and within a predetermined speed range, the monitor server matches the service system as the passed GPS gate associated service system based on the stored information in the monitor server, generates a second message based on the first message, and transmits the second message to the matched service system.

2. The GPS gate system according to claim 1, wherein the monitor server is a call center.

3. The GPS gate system according to claim 1, wherein the GPS gate is a virtual line across a pathway.

4. The GPS gate system according to claim 1, wherein the GPS gate is a virtual line surrounding a property.

5. The GPS gate system according to claim 1, wherein the GPS gate is located within proximity of a service location.

6. The GPS gate system according to claim 1, wherein passing through the GPS gate in a single direction triggers the in-vehicle system to transmit the first message to the monitor server.

7. The GPS gate system according to claim 1, wherein passing through the GPS gate in either direction triggers the in-vehicle system to transmit the first message to the monitor server.

8. The GPS gate system according to claim 1, wherein the GPS receiver uses the communication network to identify a location of the GPS receiver.

9. A method of communicating with a service station, comprising:
    determining a location of a vehicle with a GPS receiver;
    determining if the GPS receiver has crossed through a GPS gate based on the determined location and a stored GPS coordinates corresponding to the GPS gate;
    upon determining that the GPS receiver has crossed through the GPS gate, automatically generating a first message including an identity of the GPS gate and vehicle diagnostic information; and
    transmitting the generated message to a monitor server through a communications system,
    wherein the monitor server matches the GPS gate with the service station based on stored associations of GPS gate coordinates and service systems, and upon determining that the GPS receiver passed through the GPS gate in a predetermined direction and within a predetermined speed range, generates and transmits a second message to the service station, which is associated with the GPS gate, based on the first message.

10. The method according to claim 9, wherein the GPS gate is a virtual line across a pathway.

11. The method according to claim 9, wherein the GPS gate is a virtual line surrounding a property.

12. The method according to claim 9, wherein the GPS gate is located within proximity of a service location.

13. The method according to claim 9, wherein passing through the GPS gate in a single direction triggers generating the first message.

14. The method according to claim 9, wherein passing through the GPS gate in either direction triggers generating the first message.

15. The method according to claim 9, wherein the GPS receiver uses the communications system to identify a location of the GPS receiver.

16. A GPS gate system comprising:
   an in-vehicle system comprising:
      a GPS receiver communicatively connected to a GPS system to identify a location of the GPS receiver, and
      a communication interface to transmit and receive messages via a communication network and to transmit the location, and
   a monitor, comprising a server and a memory to store information associating the GPS gate to the service system, communicatively connected to the in-vehicle system via the communication network, to receive the location from the in-vehicle system and to determine if the GPS receiver passed through a GPS gate;
   a service system associated with the GPS gate communicatively connected to the monitor,
   wherein when the GPS receiver passes through the GPS gate associated with the service system in a predetermined direction and within a predetermined speed range, the monitor to match the GPS gate with the service station based on stored associations of GPS gate coordinates and service systems, to generate a message, and to transmit the message to the service system, the message including vehicle diagnostic information.

17. The GPS gate system according to claim 15, wherein the monitor determines a direction the GPS receiver is heading when crossing the GPS gate and transmits the message if the GPS receiver is heading in a predetermined direction.

18. The GPS gate system according to claim 15, wherein the monitor receives a list of vehicles scheduled to receive maintenance and an identity of a GPS receiver associated with each vehicle, and the monitor determines if a vehicle on the received list has crossed a GPS gate associated with a service location.

19. The GPS gate system according to claim 15, wherein data identifying a vehicle associated with a GPS receiver, data identifying an owner of the vehicle, data identifying a maintenance history of the vehicle and vehicle diagnostic information are stored with at least one of the in-vehicle system, the monitor and the service system.

20. A vehicle communication system comprising:
   a GPS receiver;
   a memory to store GPS coordinates corresponding to a GPS gate;
   a processor, upon determining that the GPS receiver has crossed the GPS gate, to automatically generate a first message including an identity of the GPS gate and vehicle diagnostic information; and
   a communication interface to transmit the first message to a monitor server,
   wherein the monitor server to match the GPS gate with a service station associated with the GPS gate based on stored associations of GPS gate coordinates and service systems, and upon determining that the GPS receiver crossed the GPS gate in a predetermined direction and within a predetermined speed range, to generate and transmit a second message to the service system associated with the GPS gate based on the first message.

21. The vehicle communication system according to claim 20, wherein the monitor server is a call center.

22. The vehicle communication system according to claim 20, wherein the GPS gate is a virtual line across a pathway.

23. The vehicle communication system according to claim 20, wherein the GPS gate is a virtual line surrounding a property.

24. The vehicle communication system according to claim 20, wherein the GPS gate is located within proximity of a service location.

25. The vehicle communication system according to claim 20, wherein passing through the GPS gate in a single direction triggers the in-vehicle system to transmit the first message to the monitor server.

26. The vehicle communication system according to claim 20, wherein passing through the GPS gate in either direction triggers the in-vehicle system to transmit the first message to the monitor server.

* * * * *